United States Patent [19]
Matsuzaki et al.

[11] Patent Number: 5,351,299
[45] Date of Patent: Sep. 27, 1994

[54] APPARATUS AND METHOD FOR DATA ENCRYPTION WITH BLOCK SELECTION KEYS AND DATA ENCRYPTION KEYS

[75] Inventors: Natsume Matsuzaki, Mino; Makoto Tatebayashi, Takarazuka, both of Japan

[73] Assignee: Matsushita Electric Industrial Co., Ltd., Osaka, Japan

[21] Appl. No.: 71,546

[22] Filed: Jun. 4, 1993

[30] Foreign Application Priority Data

Jun. 5, 1992 [JP] Japan .................................. 4-145964
Oct. 9, 1992 [JP] Japan .................................. 4-271273

[51] Int. Cl.$^5$ .............................................. H04K 1/04
[52] U.S. Cl. ...................................... 380/37; 380/29; 380/42
[58] Field of Search ....................... 380/28, 29, 36, 37, 380/42, 40, 47, 50

[56] References Cited

U.S. PATENT DOCUMENTS

| | | | |
|---|---|---|---|
| 4,319,079 | 3/1982 | Best | 380/37 X |
| 4,322,576 | 3/1982 | Miller | 380/37 X |
| 4,850,019 | 7/1989 | Shimizu et al. | 380/29 |
| 5,003,597 | 3/1991 | Merkle | 380/37 |
| 5,261,033 | 11/1993 | Matsui | 380/50 |

OTHER PUBLICATIONS

1981 International Conference on Communications, Denver Colo. USA Jun. 14–18 1981, IEEE pp. 40.1.1–40.1.5, Subodn Banerjee, "Milions DITS of DES Encryption in the Blink of an Eye".
"Fast Data Encipherment Algorithm Feal", by A. Shimizu et al., Eurocrypt '87, Springer Verlag.
"On The Construction of Block Ciphers Provably Secure and Not Relying on Any Unproved Hypothesis", by Y. Zheng et al., Crypto '89, Springer Verlag.
How to Strengthen DES-Like Cryptosystems Against Differential Cryptanalysis, by K. Koyama et al., IEICE Trans. Fundamentals, vol. E76-A, No. 1, Jan. 1993.

*Primary Examiner*—Tod R. Swann
*Attorney, Agent, or Firm*—Price, Gess & Ubell

[57] ABSTRACT

Disclosed is a data encryption apparatus strong to differential cryptanalysis, which is now the most influential cryptanalysis method.

According to the data encryption apparatus, input data is divided into N blocks, 1 to N-1 blocks of which is selected by a first selection unit with a block selection key. Then the selected blocks of data is compressed into a single block of data in a first combination unit, and encrypted with a data encryption key in an F-function unit. A second combination unit combines the blocks of data not selected in the first selection unit with the output of the F-function unit by XOR. An output unit outputs N blocks of data arranged in the same order as the initial N blocks, in which the 1 to N-1 blocks selected in the first selection unit are outputted without any change, and the other blocks being the outputs of the second combination unit.

30 Claims, 8 Drawing Sheets

APPARATUS AND METHOD FOR DATA ENCRYPTION WITH BLOCK SELECTION KEYS AND DATA ENCRYPTION KEYS

BACKGROUND OF THE INVENTION (1) Field of the Invention

This invention relates to an arrangement for encrypting digitized transmission data, and especially to an apparatus and method for such data encryption employed in pay broadcasting, secret communications, and the like.

(2) Related Arts

In accordance with the development of digital computers as well as their theory and integrated circuits, digital communication technology has been rapidly prevailing. With digital communication network open to the public, such problems as eavesdropping or forging by a third party are unavoidable. To cope with these problems, a sender generally transmits information by encrypting it in a certain process, while a receiver decrypts received information in the inverse of the encryption process. An example of such process proceeds as follows:

1) Binary digit data to be transmitted is divided into some blocks of data.
2) Each block of data is encrypted. For example, it is exclusive-or(denoted by '+' or XOR)ed with predetermined binary digits called a secret key or a common key that is known only to the sender and the receiver, or it is permuted with other blocks of data according to a key.
3) The data thus encrypted is sent via a public communication line.
4) The receiver decrypts received data by applying the inverse execution.

The following are the description of data encryption apparatuses with which this invention is closely concerned.

(A first conventional apparatus)

There is a data encryption method called a involution system or iterated crypro algorithm, that is for secret communication or signed communication in open digital communication network. This is one method of the conventional crypro algorithm and is utilized both in Data Encryption Standard (DES) which is most popular encryption algorithm in the U.S., and in Fast data Encipherment ALgorithm (FEAL) later developed in Japan. DES and FEAL are detailed respectively in FIPS PUB 46, NBS Jan., 1977 and in "Fast Data Encipherment algorithm FEAL" by A. Shimizu & S. Miyaguchi, Advances in Cryptology-EUROCRYPT '87, Springer-Verlag.

Figure 1:
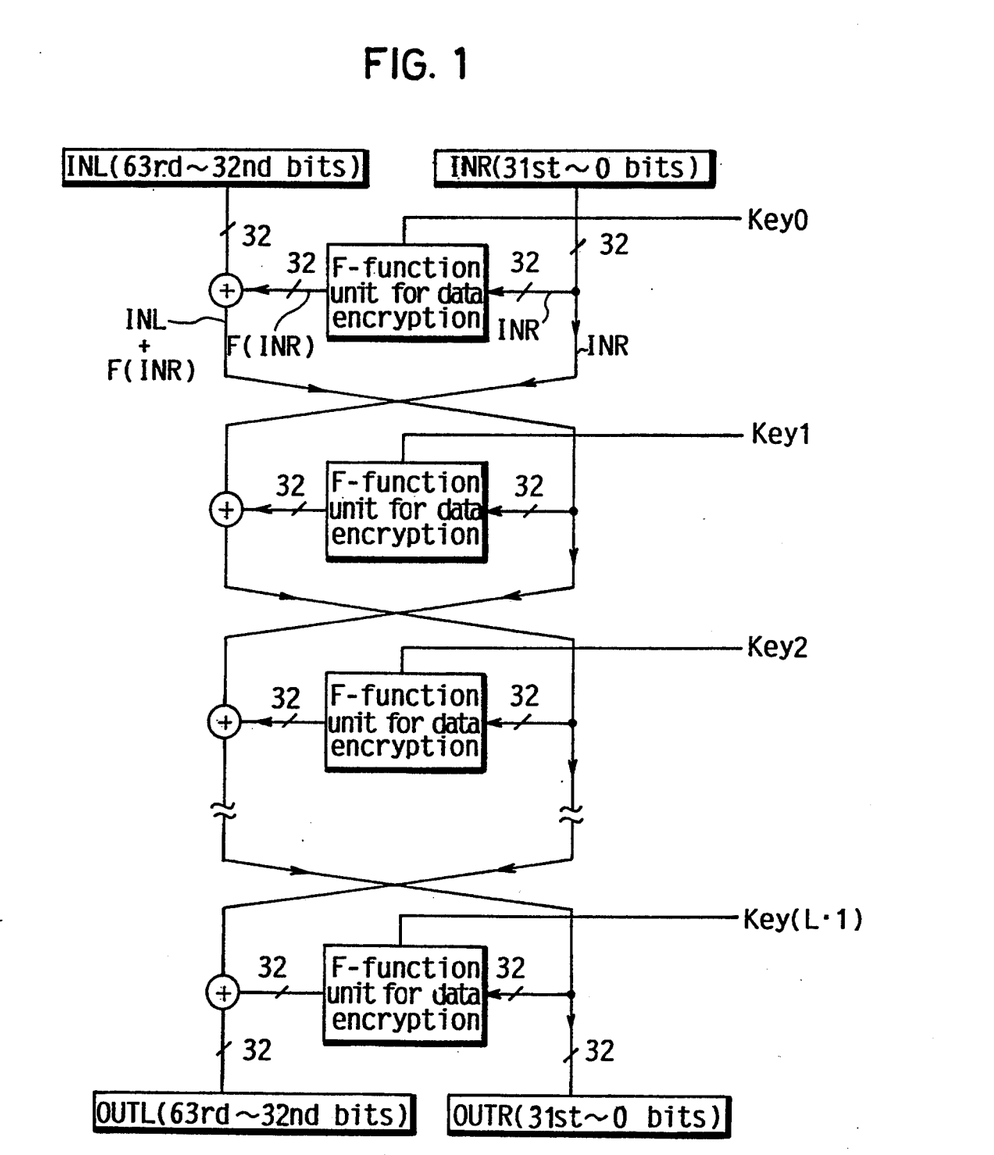
FIG. 1 shows the construction of the involution system in the first related art.

FIG. 1 shows the configuration of an involution system for 64-bit input in general.

The involution system processes iterally the process as follows:

(a) At a first stage, the 64-bit input data is divided into two 32-bit blocks: INL (left) and INR (right).
(b) The block of data INR is encrypted in an F-function unit, using an encryption Key 0.
(c) The other block of data INL is XORed with the output F(INR) of the F-function unit. The result of XOR is (INL+F(INR)).
(d) Each block of data in the above steps (b) and (c) is permuted with the other and transmitted to the next stage.

The reason of using an XOR operation in the step (c) is that thus combined data can include the blocks on both sides, and additionally the same XOR can be used in decryption.

Besides blocks of data to be encrypted, the other input of the F-function unit is a data which is just called a key or either "secret key" or "common key." The way of encryption in the F-function unit varies depending on the key. In FIG. 1, Key i is used at i-th stage (i=0, 1, 2- - - ), and a slash with "32" on a line indicates that the line is for 32 bits.

Generally, when the involution system is realized in hardware or software, a single execution unit for one stage provided with an F-function unit for data encryption and an XOR circuit is iteratively used. Therefore, hardware with the involution system can be compact, while software with the involution system can manage with a smaller program capacity.

Decryption can be performed by applying keys used in the encryption process in the inverse way and by applying the same hardware and programs. That is, the eventual results of data encryption, OUTL and OUTR become the input data INL and INR respectively, and the encryption process proceeds backwards using the keys in the reverse order like Key(L-1), - - -, Key 1, and Key 0 in the same F-function units until the initial input values are finally revealed.

As described hereinbefore, the involution system has excellent characteristics of capable of both encrypting and decrypting data to be transmitted only with an execution unit for just one stage, and further capable of making "strong" encryption by increasing the number of stages.

However, in 1990, Eli Biham and Adi Shamir at The Weizmann Institute of Science proposed a general attack to the involution system. This "attack" means that a third party (cryptanalyst) without knowledge of the key analogizes it based on information open to the public such as broadcasting, and then successfully cryptanalyzes the data transmitted. The attack is applicable to any involution system regardless of the F-function unit for data encryption and is called Differential Cryptanalysis. This can be realized when cryptanalysts can obtain the difference between the two outputs corresponding to two inputs having difference designated by the cryptanalysts (difference means XOR and is indicated by +). For example, when the cryptanalysts input $T_i$ and $T_i + \delta$ (i=1, 2, 3 - - - and $\delta$ is the value of difference) to a data encrypter fK with a fixed secret key k, if he can get the $fK(T_i) + fK(T_i + \delta)$, then he can realized the attack. This is performed as follows: first, a plurality of output differences are collected by changing the values of $T_i$ or the difference $\delta$, and then the effects caused by the algorithm is statistically analyzed that are given from the difference of a pair of input data to that of a pair of output data.

In order to make this differential cryptanalysis invalid, it is required to increase the number of stages in the involution system, and 16 times and 32 times are regarded the minimum numbers respectively in DES and in FEAL. Such attacks are detailed in "Differential Cryptanalysis of DES-Like Cryptosystems" by Eli Biham and Adi Shamir, Advances in Crypotology-CRYPTO'90, Springer-Verlag.

The basic strategy to make differential cryptanalysis invalid is to increase the number of times of iteration, which, however, demands more processing time as well as additional equipment.

In the meanwhile, the involution system itself involves the causes of making the differential cryptanalysis valid. In other words, the relationship between input data and output data of the F-function unit at each stage is comparatively simple. For example, in FIG. 1, the input of the F-function unit at the first stage is INR, that at the second stage is the XOR between INL and the output of the F-function unit of the first stage, and that at the third stage is the XOR between INR and the output of the F-function unit at the second stage. Hence, such characteristics of the involution system give cryptanalysts big clue when they can select input data as they like and know the output data.

(A second conventional apparatus)

The involution system allows input data to be divided into more than 2, so that the processing scale of the F-function unit can be diminished when the bit number of input data is the same. Accordingly, the hardware scale can be reduced. Such a challenge is described in U.S. Pat. No. 5,008,935 or "On the construction of block ciphers probably secure and not relying on any unproved hypotheses", by Y. Zheng, T. Matsumoto and H. Imai, Advances in Cryptology-CRYPTO'89, Springer-Verlag.

Figure 2:
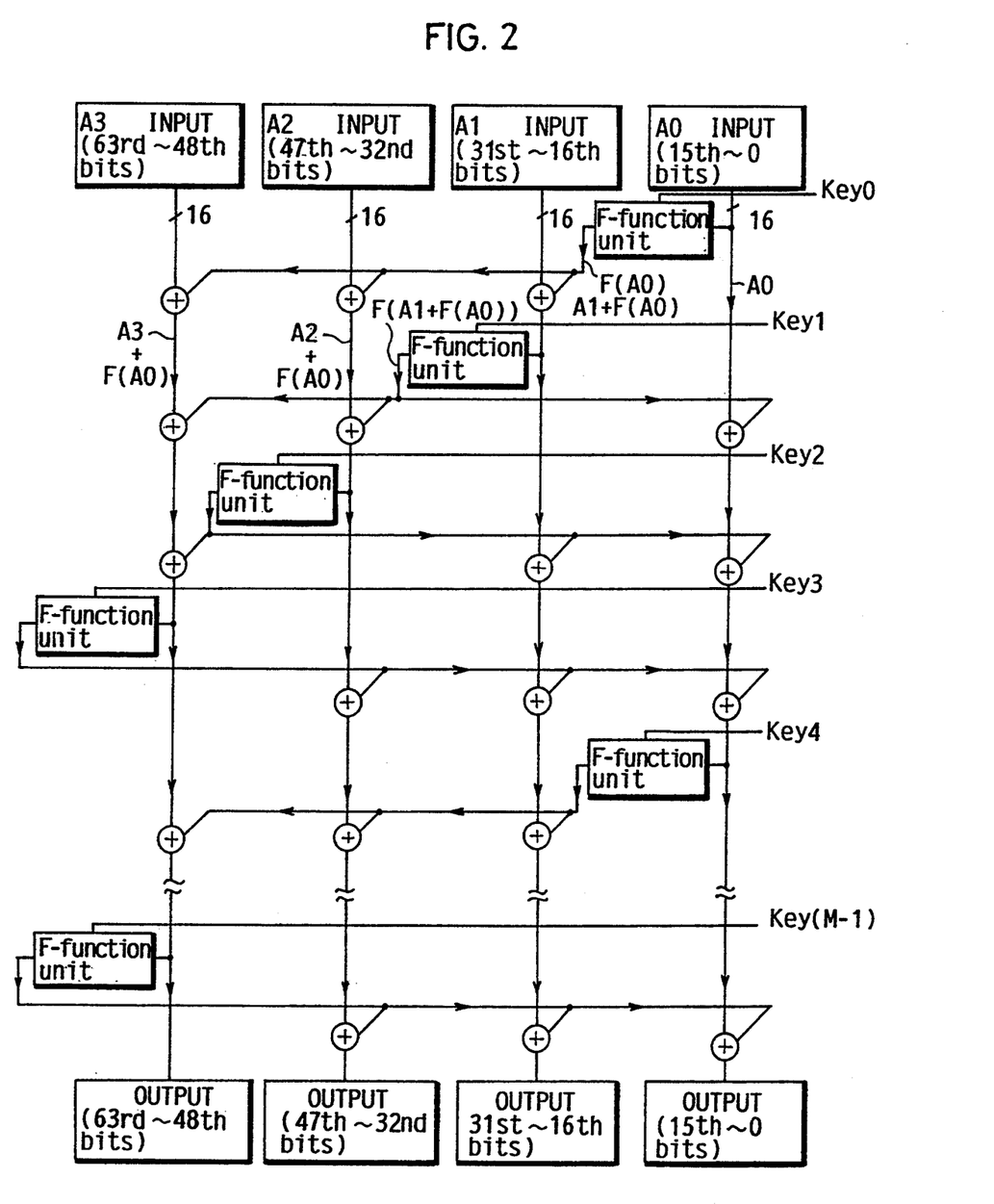
FIG. 2 shows the construction of the extended involution system in the second related art.

FIG. 2 is a revision of the construction shown in FIG. 3 of U.S. Pat. No. 5,008,935 with a general type F-function unit for data encryption. In the figure, 64-bit input data A is divided into four blocks of 16-bit data: A0, A1, A2, and A3. First, an F-function unit receives A0 and then the output F(A0) thereof is combined with the other three blocks of data by XOR. In the same manner, each of the second, third, fourth blocks of data is inputted to the F-function unit in turn so as to be combined with the other three blocks of data. In this process, four blocks of data are shifted to inputted to an F-function unit for encrypting 16-bit data. Decryption can be performed using the same hardware as encryption like in the first conventional apparatus. However, the order to use the keys must be reversed.

Although the involution system shown in FIG. 1 can encrypt the entire input data in two stages, at least four times of iteration must be performed in this construction. As a result, the effects of encryption at one stage is less than in the first conventional apparatus, so that the number of iteration must be increased for enough encryption. Additionally, Eli Biham says in the above-mentioned book that differential cryptanalysis is applicable to such extended involution system.

As described hereinbefore, the problems of the conventional data encryption apparatuses are as follows:

(1) The relationship between the input and output of the F-function unit at each stage is so simple that the cryptanalysts can analyze the encryption easily.

(2) Although the increase in the number of division of input data can diminish the hardware scale, it lessens the effects of encryption, so that the number of iteration to apply input data to the execution unit must be increased.

(3) The increase in the number of iteration slows down the processing speed.

SUMMARY OF THE INVENTION

In view of the foregoing problems, an object of this invention is to provide a data encryption apparatus having great encrypting effects with small hardware and strong to differential cryptanalysis.

The object can be achieved by a data encryption apparatus encrypting input data after dividing into N blocks of data each consisting of M bits (N and M are integers of more than 1). The data encryption apparatus comprises: a first selection unit for selecting 1 to N-1 blocks among the N blocks, using a block selection key; a second selection unit for selecting all the other blocks; a first combination unit for combining the blocks of data selected in the first selection unit into a single block of data and outputting the M-bit data; an F-function unit for encrypting the M-bit data outputted from first combination unit using a data encryption key and outputting resultant M-bit data; a second combination unit combining the M-bit data outputted from the F-function unit with each of the blocks of data selected in the second selection unit; and an output unit for outputting N blocks of data arranged in the same order as the initial N blocks, the 1 to N-1 blocks of data selected in the first selection unit being outputted without any change and the other blocks being outputted after being combined with the output of the F-function unit in the second combination unit.

The block selection key may consist of N bits corresponding to the N blocks, and the first selection unit may select a block corresponding to the bit value 1 of the block selection key.

The first combination unit may be an XOR circuit for XORing all the blocks of data selected in the first selection unit.

The first combination unit may be an one way random function, which compresses the output blocks of the first selection unit to a single block.

The second combination unit may be an adder-subtracter capable of selecting between addition and subtraction, depending on the bit value of a subtraction control signal.

The adder-subtracter may be composed of a plurality of sub adder-subtracters each independent of the others.

The adder-subtracter may comprise an XOR circuit for XORing one of the two blocks of data to be applied addition-subtraction with the subtraction control signal, and an adder for adding the XORed data and the other block of data, the bit of the subtraction control signal being 0 in addition and being 1 in subtraction.

A group consisting of the first selection unit, the second selection unit, the first combination unit, the second combination unit, the F-function unit, and the output unit may be either being concatenated in series or being used repeatedly, wherein at least one of the block selection key and the data encryption key used in each stage is different from the equivalent used in at least another stage.

The block selection key used in a stage may be the negation of the block selection key used in the immediately preceding stage.

The object can be achieved also by a data encryption apparatus encrypting input data after dividing into N blocks of data each consisting of M bits (N and M are integers of 2 or more). The data encryption apparatus comprises: a first selection unit for selecting L blocks among the N blocks, L being an integer of 1 to N-2; a block selection information generation unit for generating "block selection information", based on a block selection key and the blocks of data outputted from the first selection unit; a second selection unit for selecting 1 to N-L-1 blocks among N-L blocks which are not selected in the first selection unit using the block selection information; a third selection unit for selecting all the other blocks; a first combination unit for combining the blocks of data selected in the first and second selection units into a single block of data and outputting the M-bit data; an F-function unit for encrypting the M-bit data outputted from the first combination unit using a data encryption key and outputting resultant M-bit data; a second combination unit for combining the M-bit data outputted from the F-function unit with each of the blocks of data selected in the third selection unit by XOR; and an output unit for outputting all the blocks of data outputted from the first and second selection units and the second combination unit after permuting all the blocks.

The block selection information may consist of N-L bits corresponding to the N-L blocks, and the second selection unit may select a block corresponding to the bit value 1 of the block selection information.

The output unit may rotate all the blocks outputted from the first and second selection units and the second combination unit.

The first selection unit may use another block selection key different from the block selection key used in the block selection information generation unit.

The object can be achieved also by a data encryption apparatus encrypting input data after dividing into N blocks of data each consisting of M bits (N and M are integers of more than 1). The data encryption apparatus comprises: a grouping unit for grouping the N blocks into L superblocks, L being an integer of more than 1; a first selection unit for selecting one block from each of the L superblocks using a block selection key;a second selection unit for selecting all the other blocks in the superblocks; an F-function unit for encrypting L blocks of data selected from each of the L superblocks using a data encryption key and outputting the encrypted blocks of data to the L superblocks, the encrypted blocks of data being divided into L blocks of M-bit data and each block being assigned to each superblock; a second combination unit for combining the blocks of data outputted from the F-function unit with the blocks of data selected in the second selection unit by XOR; and an output unit for outputting N blocks of data arranged in the same order as the initial N blocks, the L blocks of data selected in the first selection unit being outputted without any change and the other blocks being outputted after being combined with the L block outputs of the F-function unit.

Another object of this invention is to provide a method for encrypting data with great encrypting effects by small hardware and strong to differential cryptanalysis.

The object can be achieved by a method for encrypting input data after dividing into N blocks of data each consisting of M bits (N and M are integers of more than 1). The method comprises the steps of: selecting 1 to N-1 blocks among the N blocks by a first selection unit, using a block selection key; selecting all the other blocks by a second selection unit; combining the blocks of data selected in the first selection unit into a single block of data and outputting the M-bit data by a first combination unit; encrypting the M-bit data outputted from the first combination unit using a data encryption key and outputting resultant M-bit data by an F-function unit for; combining the M-bit data outputted from the F-function unit with each of the blocks of data selected in the second selection unit by a second combination unit; and outputting N blocks of data arranged in the same order as the initial N blocks, the 1 to N-1 blocks of data selected in the first selection unit being outputted without any change and the other blocks being outputted after being combined with the output the F-function unit in the second combination unit.

The block selection key may consist of N bits corresponding to the N blocks, and the first selection unit may select a block corresponding to the bit value 1 of the block selection key.

The object can be achieved also by a method for encrypting input data after dividing into N blocks of data each consisting of M bits (N and M are integers of 2 or more). The method comprises the steps of: selecting L blocks among the N blocks by a first selection unit, L being an integer of 1 to N-2; generating block selection information, based on a block selection key and the blocks of data outputted from the first selection unit by a block selection information generation unit for; selecting 1 to N-L-1 blocks among N-L blocks that are not selected in the first selection unit by a second selection unit for using the information outputted from the block selection information generation unit; selecting all the other blocks that are not selected in the first and second selection units by a third selection unit; combining the blocks of data selected in the first and second selection units into a single block of data and outputting the M-bit data by a first combination unit;encrypting the M-bit data outputted from the first combination unit using a data encryption key and outputting resultant M-bit data by an F-function unit; combining the M-bit data outputted from the F-function unit with each of the blocks of data selected in the third selection unit by a second combination unit by XOR; and outputting all the blocks of data outputted from the first and second selection units and the second combination unit by an output unit after permuting all the blocks.

The object can be achieved also by a method for encrypting input data after dividing into N blocks of data each consisting of M bits (N and M are integers of more than 1). The method comprises the steps of: grouping the N blocks into L superblocks by a grouping unit, L being an integer of more than 1; selecting one block from each of the superblocks using a block selection key by a first selection unit; selecting all the other blocks in the superblocks by a second selection unit; encrypting L blocks of data selected in the first selection unit using a data encryption key and outputting the encrypted L blocks of data, the encrypted blocks of data being divided into L blocks of M-bit data and each block being assigned to each superblock; combining the blocks of data outputted from the F-function unit with the blocks of data selected in the second selection unit by a second combination unit by XOR; and outputting N blocks of data arranged in the same order as the initial N blocks, the L blocks of data selected in the first selection unit being outputted without any change and the other blocks N-L being the output of the second selection unit.

According to the above construction, data encryption capable of being processed in high speed and not being easily broken can be achieved in open digital communication.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings.

DESCRIPTION OF THE PREFERRED EMBODIMENTS

EMBODIMENT 1

Figure 3:
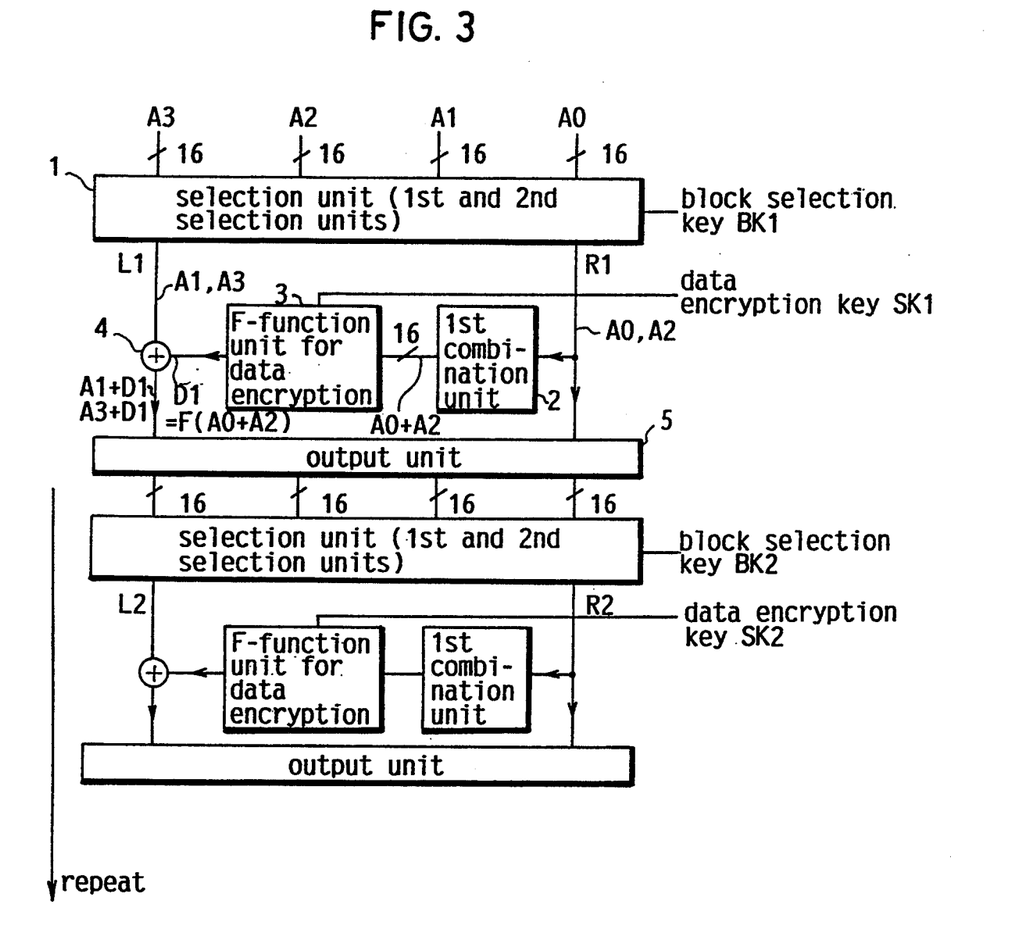
FIG. 3 shows the construction of the data encryption apparatus according to Embodiment 1 of this invention.

The construction of the data encryption apparatus of this embodiment is shown in FIG. 3, where 64-bit input data A is divided into four 16-bit blocks: A0, A1, A2, and A3. The apparatus includes the following units:

A selection unit 1 is composed of first and second selection units, the former selecting one to three optional blocks of data among the four blocks of data using a block selection key BK1 and the latter selecting all the other blocks. Let R1 and L1 be the outputs of the first and second selection units respectively. A first combination unit 2 combines blocks of data composing R1 into a single block of data. An F-function unit 3 for data encryption encrypts the output of the first combination unit using a data encryption key SK1. A second combination unit 4 combines the block encrypted by the F-function unit with L1 by XOR. An output unit 5 outputs R1 without any change and the output of the second combination unit to a selection unit of the next stage. Data encryption strong against differential cryptanalysis can be realized by having these 1-5 units for one stage repeatedly or for a number of stages.

When the first selection unit selects A2 and A0 using the block selection key BK1(={bK0, bK1, bK2, bK3}={1, 0, 1, 0}), the following process is performed:

(1) The selection unit 1 outputs A2 and A0 as R1, and A3 and A1 as L1.

(2) The first combination unit 2 makes R1 having 32 bits into 16-bit data. The easiest way of this combination is to XOR A2 and A0.

(3) The F-function unit 3 encrypts this 16-bit data, A2+A0 using the data encryption key SK1 and outputs the resultant 16- bit data D1 (=F(A2+A0)).

(4) The second combination unit 4 combines D1 to each of A3 and A1 by XOR and then outputs A3+D1 and A1+D1 respectively.

(5) The input data of the output unit 5 is {A3+D1, A2, A1+D1, A0} which respectively correspond to A3, A2, A1, and A0 for at second stage.

This process is repeated in the subsequent stages. In a data encryption apparatus provided with a number of stages, it is preferable that each of the block selection key and the data encryption key at each stage be different from each other. Each of these keys may be assigned an unique address in RAM; for example, the block selection key BK1 and the data encryption key SK1 at the first stage are respectively assigned addresses 100 and 101, while BK2 and SK2 at the second stage are respectively assigned addresses 102 and 103. This allows to use either a plurality of the same hardware units repeatedly.

As explained hereinbefore, the data encryption apparatus of this embodiment has a construction similar to the involution system, but it differs from the conventional involution system at the point of being changeable the number of blocks of data to be divided on either right or left side and the arrangement of these blocks of data using block selection keys. For example, one block of data may be put on the right side and the other three on the left, or the right side data may be A3 or A0. In this embodiment, it is better that the block selection keys used in each stage are all different, thereby solving the above-mentioned problem (1). Hence, a cryptanalyst ignorant of the block selection key can not tell which input blocks are on the right side and how many bits each side data has, so that it gets much harder for the cryptanalyst to break the data encryption. In addition, when there are more than one block of data to be selected in the first selection unit, they are effectively encrypted within a single stage, so that the problem (2) can be solved.

Solving the problems (1) and (2) means to achieve the decrease in the number of stages required for data encryption, which leads to the solution of the problem (3).

The data encryption apparatus of this embodiment still retains preferable characteristics of the conventional involution system: strong encryption can be realized by using an execution unit for one stage repeatedly, and furthermore, the same execution unit can be used for decryption as for encryption. In decryption, all the keys are used in the inverse order.

Figure 4:
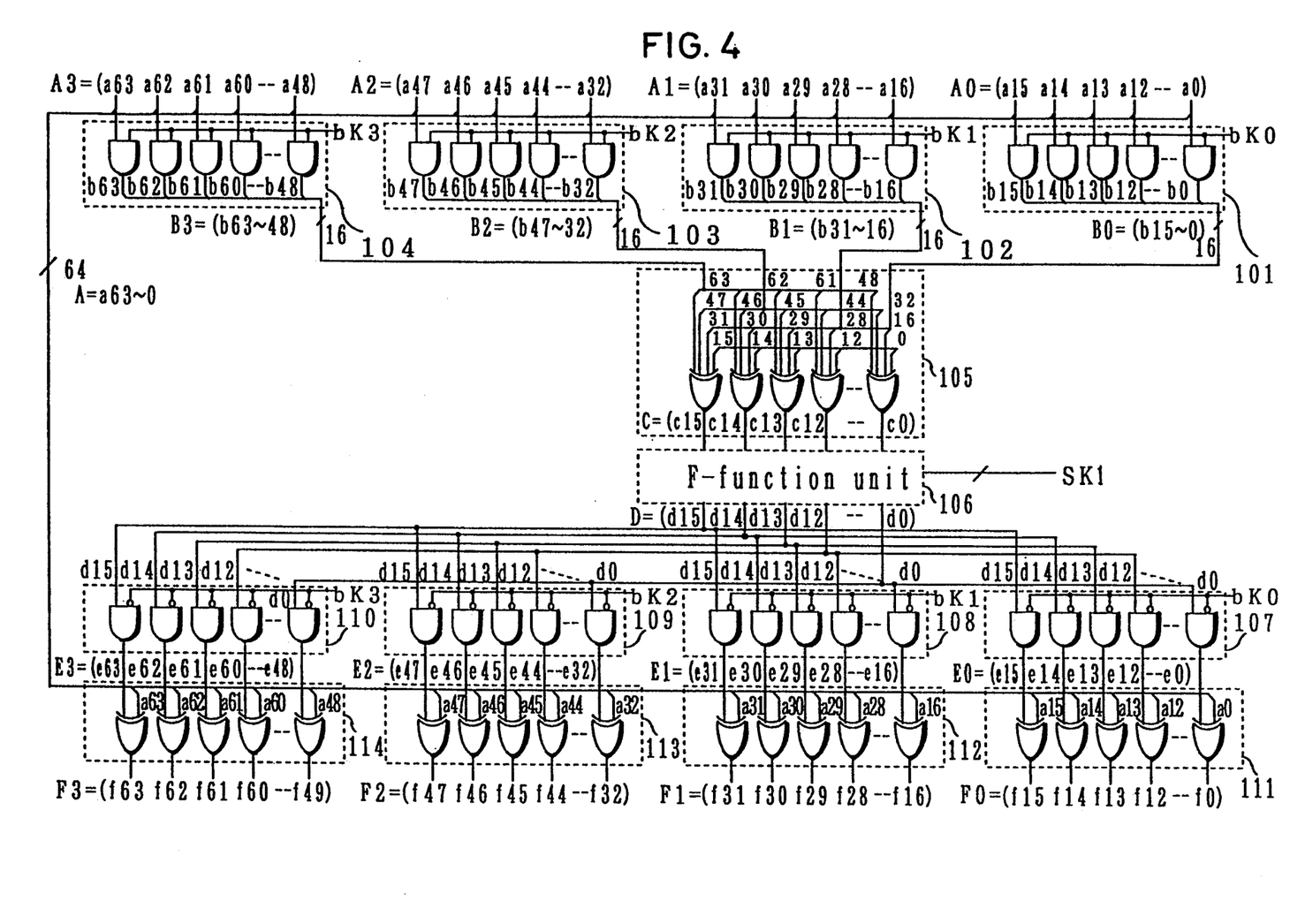
FIG. 4 shows the hardware construction of the apparatus shown in FIG.

The hardware configuration of the data encryption apparatus of this embodiment is shown in FIG. 4. The first selection unit shown in FIG. 3 consists of four small units 101-104, which respectively corresponds to block selection keys bK0-bK3 of the block selection key BK1 each having a bit value "1" or "0". The small units 101-104 select blocks of data corresponding to the block selection keys whose bit value is "1". A first combination unit 105 combines the blocks of data outputted from the first selection unit by XOR and outputs 16-bit data. An F-function unit 106 encrypts the 16-bit data using a data encryption key SK1 and outputs resulting 16-bit data. The second selection unit shown in FIG. 3 consists of four small units 107-110, which respectively corresponds to block selection keys bK0-bK3 of the block selection key BK1 each having a bit value 1 or 0. The small units 107-110 select blocks of data corresponding to the block selection keys whose bit value are zeros. The second combination unit consists of small units 111-114 each combining the blocks of data outputted from the second selection unit with the initial data A by XOR.

The operation of this data encryption apparatus in the case that bK0=1, bK1=0, bK2=1, and bK3=0 is described as follows:

(1) The first selection unit ANDs the four blocks of data A0-A3 with the block selection keys bK0-bK3. This makes each bit of both B1 and B3 be all zeros, and each bit of B0 and B2 be the same as each bit of A0 and A2.

(2) The first combination unit 105 XORs B0, B1, B2, and B3. As a result, the output C (c0-c15) of the first combination unit 105 becomes the XOR of A2 and A0.

(3) The F-function unit 106 encrypts the output C using a data encryption key SK1 and outputs a 16-bit output D(d0–d15).

(4) The second selection unit ANDs the output D with the negation of the block selection keys bK0–bK3 corresponding to each block of data. This makes each bit of E0 and E2 both corresponding to block selection keys whose values are ones be all zeros. Then, E1 and E3 corresponding to block selection keys whose values are zeros become the output D.

(5) The second combination unit 4 shown in FIG. 3 XORs the initial data A with the blocks of data outputted from the second selection unit. This makes the output data F0 and F2 be the same as the input data A0 and A2 while the output data F1 and F3 is made the XOR of the input data A1 and A3 with the output D of the F-function unit 106. That is, {A3+D, A2, A1+D, A0} are outputted, in which D is the output of the F-function unit 106, and equals D1 in FIG. 3. Thus, the data encryption apparatus shown in FIG. 3 can be realized by the hardware shown in FIG. 4. If the digits of the block selection keys bK0–bK3 are all zeros, the F-function unit 106 inputs only zeros performing neither combination nor encryption, and on the other hand, if the digits are all ones, then the output of the second selection unit is all zeros. As a result, the output blocks coincide with the input of that stage, without any effects of encryption. Therefore, selecting block selection keys whose values are either all ones or all zeros must be avoided in this embodiment.

The object of this invention can be achieved also by data encryption apparatuses each having a modified construction as follows which is used independently from the others:

(1) Although the first combination unit 105 in Embodiment 1 is composed of an XOR circuit, it may be a compressed function unit to compress a plurality of blocks into one block retaining the random characteristics in arranging zeros and ones. Especially, a one way function such as a hash function, which meets the following two requirements a) and b) can realize a "safer" construction of a data encryption apparatus. One example of the hash function is the iterative use of DES encryption in Ciper Block Chaining (CBC) mode.

a) Each bit outputted from the hash function unit is dependent on all the bits inputted thereto.
  b) It is very difficult to find another input data to obtain the same data of hash function.

(2) Although the second combination unit 4 is composed of an XOR circuit, an adder-subtracter may be used instead respectively for encryption and decryption. Addition-subtraction is an arithmetic operation -with carries, so that input difference is diffused.

Figure 5:
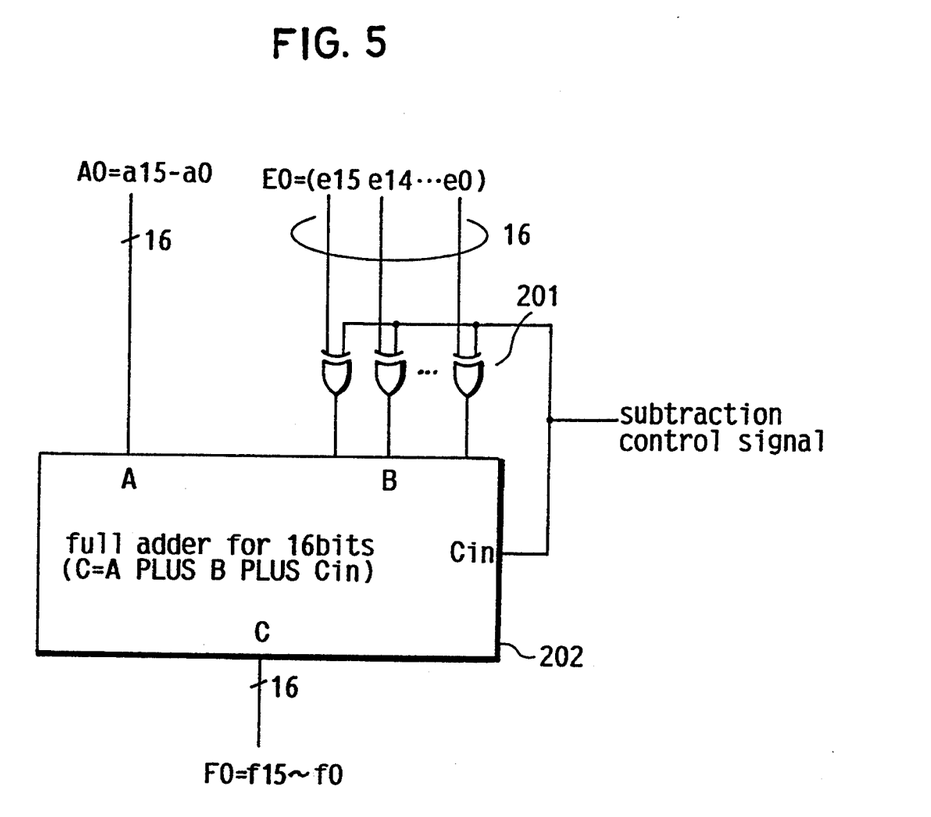
FIG. 5 shows the hardware construction of the apparatus in FIG. 3 whose second combination unit is composed of an adder-subtracter.

FIG. 5 shows the adder-subtracter for 16 bit data. The object of this invention can be achieved by replacing the adder-subtracter in FIG. 5 by the second combination units 111–114 in FIG. 4. FIG. 5 includes an XOR circuit 201, which reverses right-side input E0 when the value of the subtraction control signal is 1 and a full adder 202 for 16-bit data with a carry input (Cin). During encryption, the value of the subtraction control signal becomes 0, and then A0 (PLUS) E0 is executed, on the other hand during decryption, the value becomes 1, and then A0 (MINUS) E0 is executed. These (PLUS) and (MINUS) indicate addition and subtraction respectively. In place of the full adder for 16 bits, four full adders each for 4 bits may be used with an advantage of much higher speed processing. In that case, the subtraction control signal is inputted to Cin for each full adder, and carry signals from lower blocks of data are ignored.

(3) If the negation of the block selection key used at the first stage is used at the second stage, and also the block selection key used at the first stage is used again at the third stage, an effective encryption can be realized because all the blocks of data inputted give effects to all the blocks of data outputted within just three stages. Plot example, encryption of four blocks of data: A0, A1, A2, and A3 are carried out as follows when the values of the block selection keys bK0–bK3 are respectively 1, 0, 1, and 0:

At the first stage, the output of the F-function unit 3 is affected by A0 and A2 both corresponding to block selection keys bK0 and bK2 whose values are ones. And this output is combined with A1 and A3 corresponding to the block selection key bK1 and bK3 whose values is 0. Let the outputs at the first stage (=inputs at the second stage) be A'0, A'1, A'2, and A'3, then A'0 is affected by A0; A'1 is by A0, A1, and A2; A'2 is by A2; and A'3 is by A0, A2, and A3 respectively. At the second stage, where the negation of the block selection key bK0–bK3 is used, the outputs of the F-function unit 23 at this stage are affected by A'1 and A'3, therefore by A0, A1, A2, and A3. Let the outputs at the second stage be A''0, A''1, A''2, and A''3, then A''0 and A''2 are affected by all of the input data in the first stage: A0, A1, A2, and A3. And A''1 is affected by A0, A1, and A2 while A''3 is affected by A0, A2, and A3. At the third stage, where the same block selection keys as at the first stage are used, each block outputted at this stage is affected by all the blocks of data inputted. Even if initial data is divided into more than four blocks, the result is the same.

In the case that there are a plurality of stages, block selection keys at even numbers of stages may use the negation of those at the immediately preceding stages for an effective encryption.

EMBODIMENT 2

Figure 6:
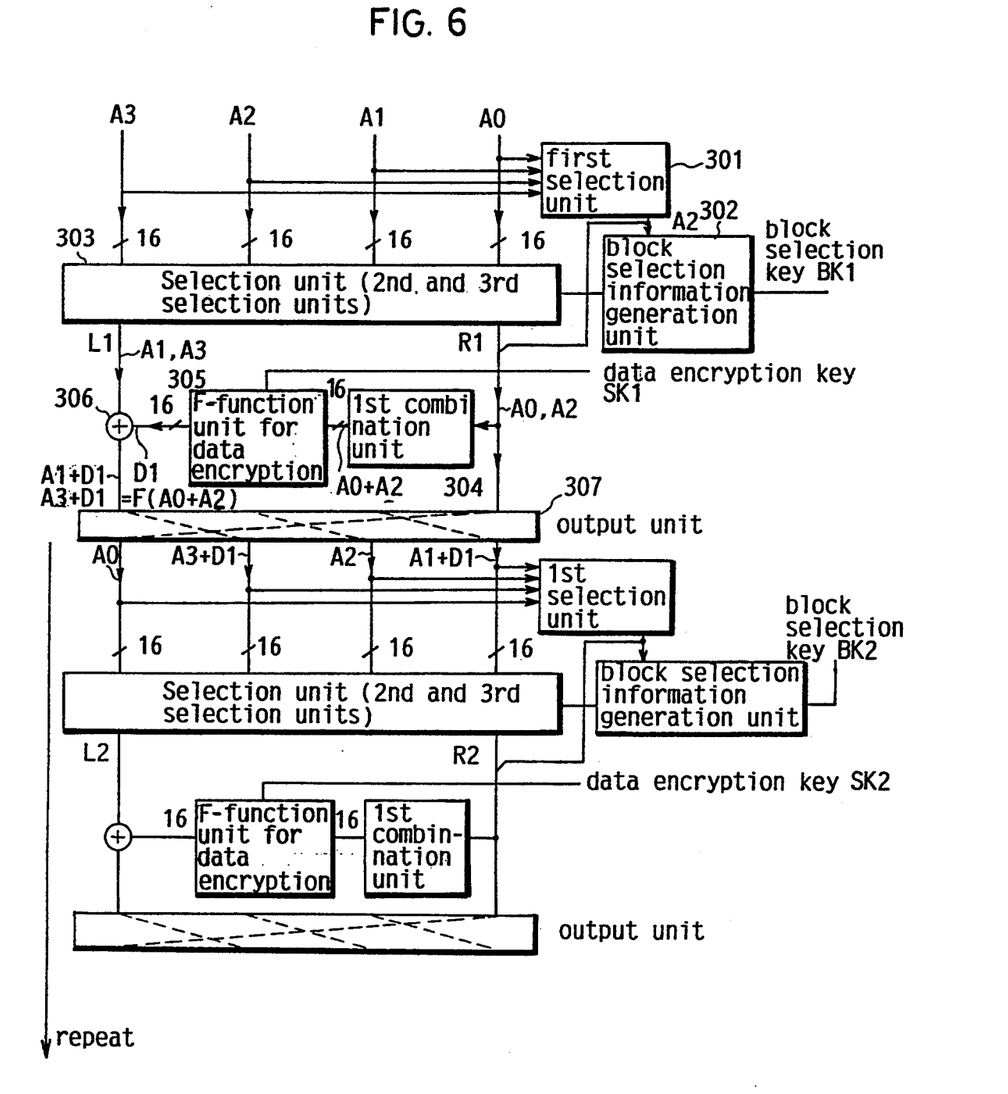
FIG. 6 shows the construction of the data encryption apparatus according to Embodiment 2 of this invention.

The configuration of the data encryption apparatus of this embodiment is shown in FIG. 6, where 64-bit input data A is divided into four blocks: A0, A1, A2, and A3 like in Embodiment 1. The data encryption apparatus includes the following units:

A first selection unit 301 selects A2 among the four blocks of data. A block selection information generation unit 302 generates information to inform a selection unit 303 which block of data should be selected, depending on A2 and a block selection key BK1. The selection unit 303 consists of a second selection unit to select any one or two blocks of data among the other three blocks of data: A0, A1, and A3 and a third selection unit to select all the other blocks. R1 is the outputs of both the first selection unit 301 and the second selection unit, while L1 is the output of the third selection unit. A first combination unit 304 combines R1 to a single block A2. An F-function unit 305 for data encryption encrypts the output of the first combination unit 304. A second combination unit 306 combines the output of the F-function unit 305 with the output of the third selection unit by XOR. An output unit 307 shifts the output of the first and second selection units and the output of the second combination unit 306 to the right for one block as indicated by broken lines in FIG. 6. The data encryption shown in FIG. 6 is realized by using an apparatus provided with the units 301–307 for a plurality of stages or using the same units for one stage repeatedly.

The operation of the data encryption apparatus of this embodiment is described with reference to FIG. 6 as follows:

(1) The first selection unit 301 selects A2 among the four blocks of data: A0, A1, A2, and A3.

(2) The block selection information generation unit 302 generates block selection information bb0, bb1, and bb3, which inform the selection unit 303 which block of data should be selected, using the block selection key BK1 and some or all of the bits of A2. The description hereinafter is about such a case that the block selection information is bb0=1, bb1=0, and bb3=0.

(3) The second selection unit selects A0 depending on the block selection information, and then the third selection unit selects A1 and A3. Accordingly, the selection unit 303 outputs A0 as R1, and A1 and A3 as L1.

(4) The first combination unit 304 outputs the XOR of A0 and A2.

(5) The F-function unit 305 encrypts A0+A2 using the data encryption key SK1 and outputs D1.

(6) The second combination unit 306 combines D1 with each of A1 and A3 by XOR. Consequently, the outputs of the second combination unit are A1+D1 and A3+D1.

(7) The output unit 307 shifts A2, A0 and the outputs of the second combination unit 306 to the right for one block. Accordingly, the outputs are (A0, A3+D1, A2, A1+D1).

The first selection unit 301 at the second stage selects A3+D1 whose position is the same as A2 in the first stage. This process is repeated hereinafter.

The block of data A2 selected in the first selection unit 301 is always included in R1, which directly goes to the next stage without any change, so that the same values can be inputted to the block selection information generation unit 302 during decryption process. The reason that the output unit 307 shifts each block to the right is to rearrange blocks of data to be inputted to the block selection information generation unit 302 at each stage.

In this embodiment, the right-left division in the involution system of input data depends not only on block selection keys but also on input data. Therefore, even if a differential cryptanalysis with fixing block selection keys is performed, the arrangement of blocks of data is varied only by changing input data. Thus, it becomes much harder for cryptanalysts ignorant of the secret keys to attack the data encryption than in the first embodiment.

The hardware of this embodiment can be realized by adding a block selection information generation unit 302 in FIG. 6 and a block shifting circuit output unit 307 in FIG. 6 to the hardware of Embodiment 1 shown FIG. 4. In other words, the block selection information generation unit 302 generates block selection information bb0-bb3 by inputting some of the blocks of data (A2 for example) and a block selection key. The information is the inputs of the small selection units 101–104 and 107–110 of the first and second selection units in FIG. 4 respectively. The block selection information generation unit 302 is composed of, for example, a look-up table. To be more precise, the type of block rotation is stored in memory for each stage and the output unit 307 reads out the stored data at each stage, according to which a rotation is performed.

The following modification can be applied to the data encryption apparatus of this embodiment.

(1) Although the output unit 307 shifts each block to the right, all the outputs of the first, second, and third selection units can be permuted at random instead. Or, the blocks may be permuted using another secret key.

(2) Although the first selection unit 301 selects a predetermined block of data, it may selects a plurality of blocks of data. In addition, another secret key can be used for block selection.

In either case, great attention must be paid to the configuration of the block selection information generation unit 302 and block selection keys so as to avoid for all the blocks of data to be exclusively inputted to the right side. Therefore the block selection information should not be all ones.

Examples of the practical measures for that is as follows:

1) The block selection information generation unit 302 is composed of a look-up table in order to prevent the output from being all ones.

2) The block selection information generation unit 302 is realized by a logical circuit provided with an XOR circuit for reversing the output if it becomes all ones.

Embodiment 3

Figure 7:
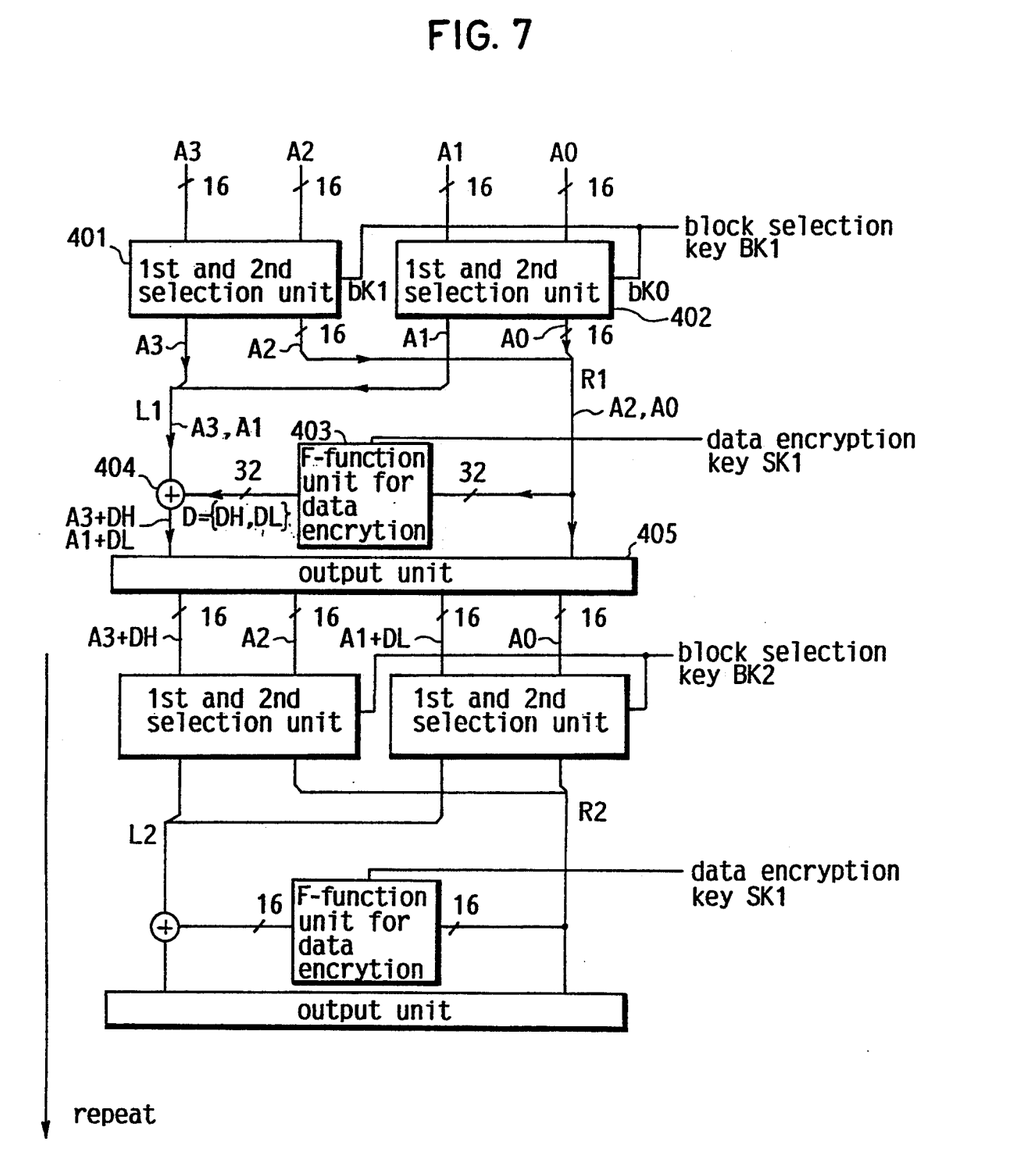
FIG. 7 shows the construction of the data encryption apparatus according to Embodiment 3 of this invention.

The configuration of the data encryption apparatus of this embodiment is shown in FIG. 7, where 64-bit input data A is first divided into four blocks of data: A0, A1, A2, and A3, and then, A2 and A3 compose a first superblock while A0 and A1 compose a second superblock.

In the drawing, a selection unit 401 consists of a first selection unit to select either A2 or A3 in the first superblock using a block selection key bK1, and a second selection unit to select the other. Another selection unit 402 consists of a first selection unit to select either A0 or A1 in the second superblock using a block selection key bK0, and a second selection unit to select the other. And the 32-bit data R1 (the right side in an involution system) is a concatenation of the output data of the first selector, unit in the units 401 and 402. An F-function unit 403 for data encryption encrypts 32-bit data R1 using a data encryption key SK1 and outputs resulting 32-bit encrypted data. Let the output of the F-function unit 403 be divided into the upper 16-bit data DH and the lower 16-bit data DL. A combination unit 404 combines DH with the output of the second selection unit in the unit 401 by XOR.

The unit 404 also combines DL and the output of the second selection unit in the unit 402 by XOR. An output unit 405 outputs blocks of data arranged in the same order as the initial blocks; blocks of data on the right side of the selection units are outputted without any change, and those on the left side are outputted after being combined with the output of the F-function unit.

Let the selection units 401 and 402 select A2 and A0 respectively using the block selection key BK1. That is described as follows with reference to FIG. 7:

(1) Using the block selection key BK1, the selection unit 401 outputs A2 to the right and A3 to the left, and the selection unit 402 outputs A0 to the right and A1 to the left.

(2) The F-function unit 403 encrypts 32-bit data R1 using a data encryption key SK1 and outputs resulting 32-bit data. The high and low order bits of R1 are respectively A2 outputted from the selection unit 401 and A0 outputted from the selection unit 402. Let the high and low order 16 bits of the 32-bit output data of the F-function be respectively called DH and DL.

(3) The combination unit 404 XORs between A3 outputted from the selection unit 401 and DH, and also XORs between A1 outputted from the selection unit 402 and DL.

(4) The output unit 405 outputs blocks of data arranged in the same order as the initial blocks; the blocks of data on the right side of the selection units 401 and 402 are outputted to the next stage without any change, and those on the left side are outputted after being combined with the output of the F-function unit.

Accordingly, after the process at the first stage, {A3+DH, A2, A1+DL, A0} are outputted. The process is repeated using the block selection key BK2 in the subsequent stage.

To be more general, one block is selected from each of L-superblock having N/L block input as shown in FIG. 7. These L-blocks on the right side R1 are inputted to the F-function unit. And the F-function unit encryps the L-block input using a data encryption key. Then, the L-block outputs of the F-function unit is combined with the blocks selected as the left-side output of the corresponding superblocks by XOR.

As described hereinbefore, the apparatus of this embodiment has the construction similar to the involution system cited in Embodiments 1 and 2, but it can eliminate a first combination unit to combine a plurality of blocks of input data before being inputted to the F-function unit in Embodiments 1 and 2. Instead, an F-function unit with L-block capacity is used. Therefore, if the F-function unit has the characteristics of injection and surjection, the distribution of zeros and ones in the output is well balanced. That is, if $2^{64}$ patterns are inputted with equal probability, then $2^{64}$ patterns are outputted with equal probability also. Hence, encryption gets harder to be broken.

Figure 8:
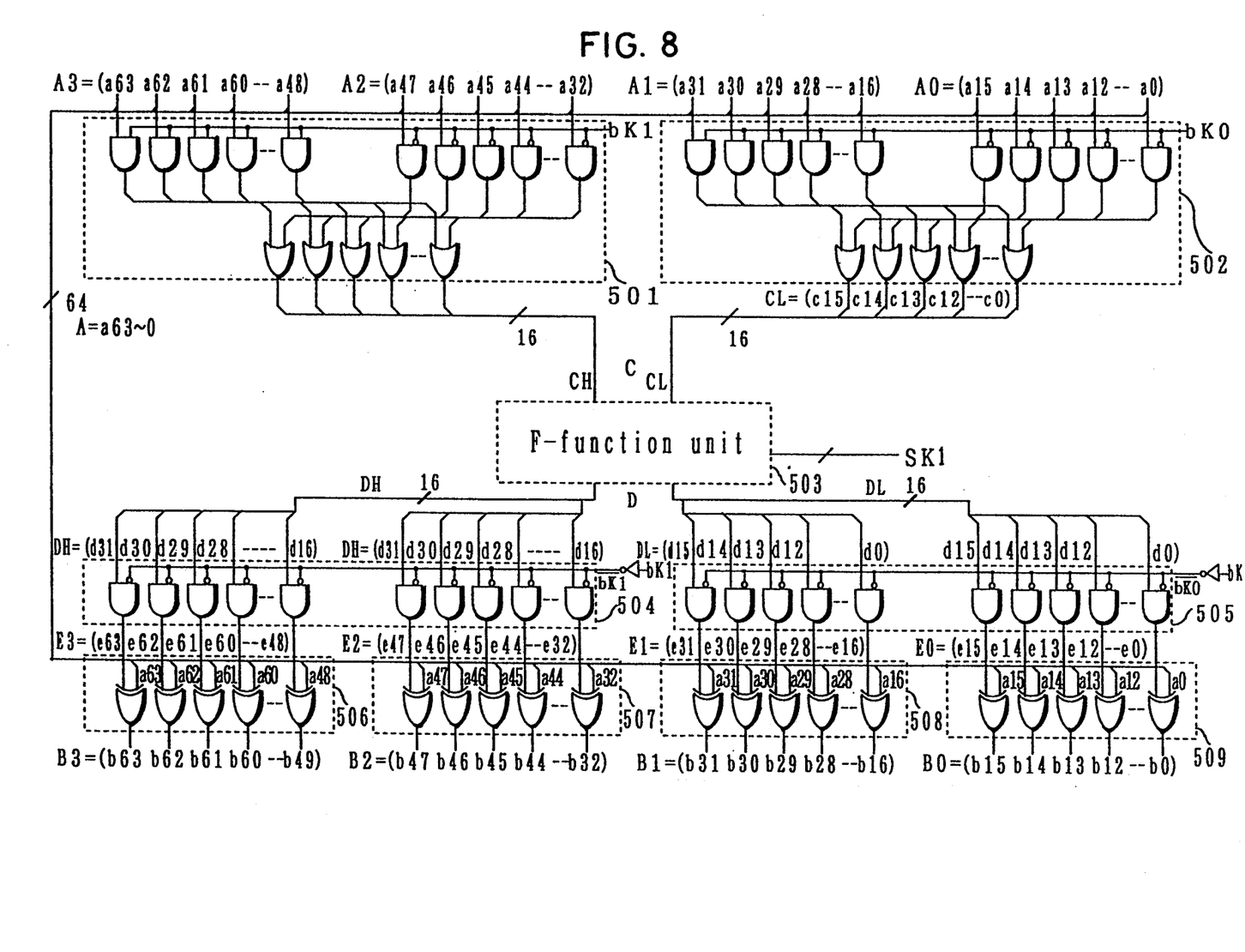
FIG. 8 shows the hardware construction of the apparatus shown in FIG. 7.

FIG. 8 shows an example of the hardware of the data encryption apparatus of this embodiment. In the figure, a first selection unit 501 selects either A3 or A2 among a first superblock using a block selection key bK1. Another first selection unit 502 selects either A1 or A0 among a second superblock using a block selection key bK0. An F-function unit 503 for data encryption encrypts 32-bit data composed of the outputs of the first selection units 501 and 502 using a data encryption key SK1 and outputs resultant 32-bit encrypted data. Each of second selection units 504 and 505 outputs the output of the F-function unit 503 to a block corresponding to a block selection key whose value is 0. Combination units 506–509 each combines the output of the corresponding selection unit 504 or 505 and the corresponding initial blocks of data A0, A1, A2, or A3 by XOR.

The operation of the data encryption apparatus of this embodiment is described with reference to FIG. 8 as follows:

It is assumed that the bit values of the block selection keys bK0 and bK1 are bK0=0 and bK1=0 respectively. Since the block selection keys are used to select blocks to be on the right side among each superblock in this case.

(1) The first selection unit 501 selects A2 among the first superblock using the corresponding block selection key bK1. The first selection unit 502 selects A0 among the second superblock using the corresponding block selection key bK0. Therefore data CH equals to A2 and CL equals to A0.

(2) The F-function unit 503 encrypts data composed of A2 (=CH) and A0 (=CL) using the data selection key SK1 and outputs 32-bit output value D. The 32-bit data D consists of DH as the high-order 16 bit and DL as the low-order 16 bit.

(3) The second selection unit 504 outputs the high-order 16-bit DH to a block corresponding to the block selection key bK1=0. The second selection unit 505 outputs the low-order 16-bit, DL of the output value D to a block corresponding to the block selection key bK0=1. As a result, the outputs of the second selection unit E3, E2, El, and E0 respectively become DH, 0, DL, and 0.

(4) The combination units 506–509 XOR input data A(A3, A2, A1, A0) with the output data E (E3, E2, E1, E0) of the second selection unit. As a result, the output data B {B3, B2, B1, B0} of the data encryption apparatus of this embodiment become {A3+DH, A2, A1+DL, A0}. Thus, the configuration of the hardware shown in FIG. 8 can realize that shown in FIG. 7.

The numbers of initial data bits, divisions, superblocks and others can be determined according to the characteristics of signals to be processed or to the connection with other equipment.

This algorithm can be realized in the software, not in the hardware for the data encryption apparatus.

Although each block selection key is assigned 1 bit, more bit can be assigned.

Although the first selection unit uses block selection keys in Embodiment 3, it can use input data like in Embodiment 2.

Although two superblocks each consisting of two blocks are used in Embodiment 3, all superblocks do not have to have the same number of blocks.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data encryption apparatus for encrypting input data after dividing the input data into N blocks of data each consisting of M bits, wherein N is an integer greater than 2 and M is an integer greater than 1, the data encryption apparatus comprising:
   a first selection unit for selecting 1 to N-1 blocks among the N blocks, using a block selection key;
   a second selection unit for selecting all the other blocks;
   a first combination unit for combining the blocks of data selected in the first selection unit into a single block of data and outputting the M-bit data;
   an F-function unit for encrypting the M-bit data outputted from the first combination unit using a data encryption key and outputting resultant M-bit data;

a second combination unit for combining the M-bit data outputted from the F-function unit with each of the blocks of data selected in the second selection unit; and an output unit for outputting N blocks of data arranged in the same order as the initial N blocks, the blocks selected in the first selection unit being outputted without any change and the other blocks being the outputs of the second combination unit.

2. The data encryption apparatus of claim 1, wherein the block selection key consists of N bits corresponding to the N blocks, and the first selection unit selects a block corresponding to the bit value 1 of the block selection key.

3. The data encryption apparatus of claim 2, wherein the first combination unit is an XOR circuit for XORing all the blocks of data selected in the first selection unit.

4. The data encryption apparatus of claim 2, wherein the first combination unit is an one way random function, to which the blocks of data outputted from the first selection unit is inputted.

5. The data encryption apparatus of claim 2, wherein the second combination unit is an adder-subtracter capable of selecting between addition and subtraction, depending on the bit value of a subtraction control signal.

6. The data encryption apparatus of claim 5, wherein the adder-subtracter is composed of a plurality of sub adder-subtracters each independent of the others.

7. The data encryption apparatus of claim 6, wherein the adder-subtracter comprises an XOR circuit for XORing one of the two blocks of data to be applied addition-subtraction with the subtraction control signal, and an adder for adding the XORed data and the other block of data with the subtraction control signal as a carry, wherein the bit of the subtraction control signal being 0 in addition and being 1 in subtraction.

8. The data encryption apparatus of claim 5, wherein the adder-subtracter comprises an XOR circuit for XORing one of the two blocks of data to be applied addition-subtraction with the subtraction control signal, and an adder for adding the XORed data and the other block of data, the bit of the subtraction control signal being 0 in addition and being 1 in subtraction.

9. The data encryption apparatus of claim 2, wherein a group consisting of the first selection unit, the second selection unit, the first combination unit, the second combination unit, the F-function unit, and the output unit is one of being concatenated in series and being used repeatedly, wherein at least one of the block selection key and the data encryption key used in each stage is different from the equivalent used in at least another stage.

10. The data encryption apparatus of claim 9, wherein the block selection key used in a stage is the negation of the block selection key used in the immediately preceding stage.

11. The data encryption apparatus of claim 1, wherein the first combination unit is an XOR circuit for XORing all the blocks of data selected in the first selection unit.

12. The data encryption apparatus of claim 1, wherein the first combination unit is an one way random function generator, to which the blocks of data outputted from the first selection unit is inputted.

13. The data encryption apparatus of claim 1, wherein the second combination unit is an adder-subtracter capable of selecting between addition and subtraction, depending on the bit value of a subtraction control signal.

14. The data encryption apparatus of claim 13, wherein the adder-subtracter is composed of a plurality of sub adder-subtracters each independent of the others.

15. The data encryption apparatus of claim 14, wherein the adder-subtracter comprises an XOR circuit for XORing one of the two blocks of data to be applied addition-subtraction with the subtraction control signal, and an adder for adding the XORed data and the other block of data, the bit of the subtraction control signal being 0 in addition and being 1 in subtraction.

16. The data encryption apparatus of claim 13, wherein the adder-subtracter comprises an XOR circuit for XORing one of the two blocks of data to be applied addition-subtraction with the subtraction control signal, and an adder for adding the XORed data and the other block of data, the bit of the subtraction control signal being 0 in addition and being 1 in subtraction.

17. The data encryption apparatus of claim 1, wherein a group consisting of the first selection unit, the second selection unit, the first combination unit, the second combination unit, the F-function unit, and the output unit is one of being concatenated in series and being used repeatedly, wherein at least one of the block selection key and the data encryption key used in each stage is different from the equivalent used in at least another stage.

18. A data encryption apparatus for encrypting input data after dividing the input data into N blocks of data each consisting of M bits wherein N is an integer greater than 2 and M is an integer of 2 or more, the data encryption apparatus comprising:

a first selection unit for selecting L blocks among the N blocks, L being an integer of 1 to N-2;

a block selection information generation unit for generating block selection information, based on a block selection key and the blocks of data outputted from the first selection unit;

a second selection unit for selecting 1 to N-L-1 blocks among N-L blocks that are not selected in the first selection unit using the information outputted from the block selection information generation unit;

a third selection unit for selecting all of the other blocks that are not selected in the first and second selection units;

a first combination unit for combining the blocks of data selected in the first and second selection units into a single block of data and outputting the M-bit data;

an F-function unit for encrypting the M-bit data outputted from the first combination unit using a data encryption key and outputting resultant M-bit data;

a second combination unit for combining the M-bit data outputted from the F-function unit with each of the blocks of data selected in the third selection unit by XOR; and an output unit for outputting all the blocks of data outputted from the first and second selection units and the second combination unit after permuting all the blocks.

19. The data encryption apparatus of claim 18, wherein the block selection information that is the output of the block selection information generation unit consists of N-L bits corresponding to the N-L blocks, and the second selection unit selects a block corresponding to the bit value 1 of the block selection information.

20. The data encryption apparatus of claim 19, wherein the output unit rotates all the blocks outputted from the first and second selection units and the second combination unit.

21. The data encryption apparatus of claim 19, wherein the first selection unit uses a block selection key different from the block selection key used in the block selection information generation unit.

22. The data encryption apparatus of claim 18, wherein the output unit rotates all the blocks outputted from the first and second selection units and the second combination unit.

23. The data encryption apparatus of claim 18, wherein the first selection unit uses a block selection key different from the block selection key used in the block selection information generation unit.

24. A data encryption apparatus for encrypting input data after dividing the input data into N blocks of data each consisting of M bits, wherein N is an integer greater than 2 and M is an integer greater than 1, the data encryption apparatus comprising:
- a grouping unit for grouping the N blocks into L superblocks, L being an integer greater than 1;
- a first selection unit for selecting one block from each of the L superblocks using a block selection key;
- a second selection unit for selecting all the other blocks in each of the superblocks;
- an F-function unit for encrypting L blocks of data selected in the first selection unit using a data encryption key and outputting the encrypted L blocks of data, the encrypted blocks of data being divided into the L blocks of M-bit data and each block being assigned to each superblock;
- a combination unit for combining the blocks of data outputted from the F-function unit with the blocks of data selected in the second selection unit by XOR; and
- an output unit for outputting N blocks of data arranged in the same order as the initial N blocks, the blocks selected in the first selection unit being outputted without any change and the other blocks being the outputs of the second selection unit.

25. The data encryption apparatus of claim 24, wherein the combination unit is composed of an XOR circuit for, when the F-function unit outputs the L blocks of M-bit data for each of the L superblocks, firstly producing blocks of the M-bit data whose number is smaller by 1 than the number of the blocks included in the corresponding superblock and secondly XORing thus produced M-bit data with M-bit data of each block selected in the second selection unit in the corresponding superblock.

26. A method for encrypting input data after dividing the input data into N blocks of data each consisting of M bits, wherein N is an integer greater than 2 and M is an integer greater than 1, the data encryption apparatus comprising:
- selecting 1 to N-1 blocks among the N blocks by a first selection unit, using a block selection key;
- selecting all the other blocks by a second selection unit;
- combining the blocks of data selected in the first selection unit into a single block of data and outputting the M-bit data by a first combination unit;
- encrypting the M-bit data outputted from the first combination unit using a data encryption key and outputting resultant M-bit data by an F-function unit for;
- combining the M-bit data outputted from the F-function unit with each of the blocks of data selected in the second selection unit by a second combination unit; and
- outputting N blocks of data arranged in the same order as the initial N blocks, the blocks selected in the first selection unit being outputted without any change and the other blocks being the outputs of the second combination unit.

27. The method of claim 26, wherein the block selection key consists of N bits corresponding to the N blocks, and the first selection unit selects a block corresponding to the bit value 1 of the block selection key.

28. A method of encrypting input data after dividing the input data into N blocks of data each consisting of M bits, wherein N is an integer greater than 2 and M is an integer greater than 1, the data encryption apparatus comprising:
- selecting L blocks among the N blocks by a first selection unit, L being an integer of 1 to N-2;
- generating block selection information, based on a block selection key and the blocks of data outputted from the first selection unit by a block selection information generation unit for;
- selecting 1 to N-L-1 blocks among N-L blocks that are selected in the first selection unit by a second selection unit for using the information outputted from the block selection information generation unit;
- selecting all of the other blocks that are not selected in the first and second selection units by a third selection unit;
- combining the blocks of data selected in the first and second selection units into a single block of data and outputting the M-bit data by a first combination unit;
- encrypting the M-bit data outputted from the first combination unit using a data encryption key and outputting resultant M-bit data by an F-function unit;
- combining the M-bit data outputted from the F-function unit with each of the blocks of data selected in the third selection unit by a second combination unit by XOR; and
- outputting all the blocks of data outputted from the first and second selection units and the second combination unit by an output unit after permuting all the blocks.

29. A method for encrypting input data after dividing the input data into N blocks of data each consisting of M bits, wherein N is an integer greater than 2 and M is an integer greater than 1, the data encryption apparatus comprising:
- grouping the N blocks into L superblocks by a grouping unit, L being an integer of more than 1;
- selecting one block from each of the superblocks using a block selection key by a first selection unit;
- selecting all the other blocks in each of the superblocks by a second selection unit;
- encrypting L blocks of data selected in the first selection unit using a data encryption key and outputting the encrypted L blocks of data, the encrypted blocks of data being divided into the L blocks of M-bit data and each block being assigned to each superblock;
- combining the blocks of data outputted from the F-function unit with the blocks of data selected in the second selection unit by a second combination unit by XOR; and outputting N blocks of data arranged in the same order as the initial N blocks, the blocks selected in the first selection unit being outputted without any change and the other blocks being the outputs of the second selection unit.

30. An apparatus for encrypting input data, the input data consisting of a predetermined number greater than 2 of input data blocks, the apparatus comprising:

selection means for selecting a number of input data blocks from the predetermined number of input data blocks, the selection means using a block selection key;

a first combination unit operatively connected to the selection means for forming a first combination from the selected number of input data blocks;

an encryption unit for accepting and encrypting the first combination, thereby forming an encrypted result, the encryption unit using an encryption key;

a second combination unit for forming a second combination from the encrypted result and from a number of input data blocks not selected by the selection means; and means operatively connected to the selection means and the second combination unit, for outputting both the second combination and the selected number of input data blocks.

* * * * *